United States Patent
Tian

(10) Patent No.: US 8,341,153 B2
(45) Date of Patent: Dec. 25, 2012

(54) APPARATUS AND METHOD FOR HEAP SORTING WITH COLLAPSED VALUES AND SELECTIVE VALUE EXPANSION

(75) Inventor: Feng Tian, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 320 days.

(21) Appl. No.: 12/555,629

(22) Filed: Sep. 8, 2009

(65) Prior Publication Data

US 2011/0060748 A1     Mar. 10, 2011

(51) Int. Cl.
*G06F 7/00*     (2006.01)
(52) U.S. Cl. ......... 707/736; 707/737; 707/752; 707/797
(58) Field of Classification Search ........................ None
See application file for complete search history.

(56) References Cited

U.S. PATENT DOCUMENTS 6,553,364 B1 *   4/2003   Wu ........................................ 1/1
2008/0235228 A1 *   9/2008   Kent et al. ......................... 707/7

OTHER PUBLICATIONS

Author: Jon Louis Bentley; Title: Multidimensional Binary Search Trees Used for Associative Searching, Date: 1975; Publisher: Association for Computing Machinery, Inc..; Pertinent pp. 509-519 (whole document as attached in pdf).*
Author: Jon Louis Bentley; Title: Multidimensional Binary Search Trees in Database Application, Date: 1979; Publisher: IEEE.; Pertinent pp. 333-340 (whole document as attached in pdf).*

* cited by examiner

*Primary Examiner* — Debbie Le
*Assistant Examiner* — Anh Tai Tran
(74) *Attorney, Agent, or Firm* — Barry N. Young

(57) ABSTRACT

A computer readable storage medium includes executable instructions to order a binary tree using primary values and selected secondary values required to resolve a position in the binary tree. The remaining secondary values are in a do not care state. A new primary value is compared to the primary value at the root node of the binary tree. If necessary, a new secondary value is compared to the secondary value at the root node to determine whether the new primary value and the new secondary value or the value at the root node should be placed in a sorted list.

12 Claims, 8 Drawing Sheets

APPARATUS AND METHOD FOR HEAP SORTING WITH COLLAPSED VALUES AND SELECTIVE VALUE EXPANSION

FIELD OF THE INVENTION

This invention relates generally to sorting data. More particularly, this invention relates to incomplete heap sorting with collapsed values and selective value expansion.

BACKGROUND OF THE INVENTION

Sorting involves placing elements in a certain order. Most commonly, sorting is performed by numerical or lexicographical order. Efficient sorting is important to optimize search and merge operations, which are very common in a large number of computational activities. For example, sorting is one of the most important operations in a database system. The most prominent cases are queries that include an ORDER BY clause, which specifies the sort order for query output. A variety of other operations, such as aggregation, joins or building of indices may also leverage sorting of data to achieve better performance.

One important aspect of sorting in a large database is that the input data may be significantly larger than the available physical memory. Therefore, in-memory sorting cannot be used. To circumvent this problem, database systems use external sort operations (e.g., operations performed on disk). An external sort initially generates sorted subdivisions, also referred to as "runs". The runs on different disks are then merged to form a final sort result.

Research and commercial development of external sort operations have focused on reducing input/output operations because the input/output cost is typically considered a dominating performance factor. Increasingly, this trade-off is changing. Modern large-scale database systems have very large aggregated input/output bandwidth.

Moreover, in On-Line Analytical Processing (OLAP) applications, the characteristics of data differ from more traditional database applications, such as On-Line Transactional Processing (OLTP). For example, while most sort operations in an OLTP system are executed on only a small number of sorting values, i.e., columns to sort on, it is common for OLAP queries to have tens or even hundreds of sorting values. Often, such a sort on complex data is dominated by CPU cost instead of input/output cost.

In the case where there are many sorting values, the number of columns that need to be considered during comparison is dependent upon the progress of the sorting algorithm. In the beginning, only the first several values are typically compared. However, as sorting progresses, more and more values need to be extracted and compared. From the user's perspective, the sorting algorithm becomes increasingly slower as it progresses. Data extraction and comparison may add significant overhead.

Heap sort is a common approach to sorting. A heap sort relies upon a data structure called a heap, which is a special type of binary tree. Heap sort consists of two phases: a build phase in which data is organized in a heap data structure and a retrieval phase in which elements are retrieved in sorted order. During the build phase a data list is formed into a heap, the root node is guaranteed to be the smallest (or largest) element. The remaining elements in the heap are organized in a way that child elements are always smaller (or greater) than their direct ancestors—this property is referred to as the heap property. During the retrieval phase the root is removed and placed in a sorted list, the heap is rearranged so the smallest (or largest) element remaining moves to the root. The removal of the root node and the successive reorganization of the heap is repeated until all elements have been removed from the heap.

FIG. 1 illustrates processing associated with a heap sort. When a new value arrives (New Value—YES 102) it is processed 104 and inserted into the heap so that the heap property holds (the following examples will only references the smallest value). If necessary, previously inserted values are reorganized 100 to place the smallest value at the root.

If no new value arrives (New Value—NO 102) it is determined whether the process is completed at block 106. If so, (Done—YES), the sorted values are loaded into a final sorted list 108. If not, (Done—NO), then control returns to block 102 until a new value arrives.

These operations are more fully appreciated with reference to FIG. 2, which illustrates a sorted heap. In particular, the heap is sorted by lowest number, relying upon the first value entry and then the second value entry (i.e., (first value, second value)).

Suppose now that a new value (4, 8) arrives. The new value (4, 8) is put in its place, as shown in FIG. 3.

Suppose no new values arrive for processing. The current root value (2, 3) is removed and placed in the final sorted list. The heap is reorganized according to the heap property: (2, 7) is placed at the root and (4, 8) moves up accordingly, as shown in FIG. 4. Next, the root value (2, 7) is removed from the heap and added to the sorted list. Now (4, 4) becomes the new root and (4, 6) moves up, as shown in FIG. 5. This processing is repeated until the heap contains no more values. At this point all elements have been retrieved in the desired sort order. The sort process is complete.

While heap sorting is well known and widely exploited, it suffers from various performance problems. For example, the strict heap reorganization property results in a large number of comparisons, which presents performance problems.

Therefore, it would be desirable to develop a more computationally efficient form of heap sorting.

SUMMARY OF THE INVENTION

A computer readable storage medium includes executable instructions to order a binary tree using primary values and selected secondary values required to resolve a position in the binary tree. The remaining secondary values are in a do not care state. A new primary value is compared to the primary value at the root node of the binary tree. If necessary, a new secondary value is compared to the secondary value at the root node to determine whether the new primary value and the new secondary value or the value at the root node should be relocated in the binary tree.

A computer readable storage medium includes executable instructions to order values of a binary tree using primary values. The order of the binary tree is refined using required secondary values while the remaining secondary values are in a do not care state. It is determined whether the position for a new value is resolvable based upon the primary value of the new value. If so, the new value is processed. If not, a secondary value of the new value is assessed to determine if the position of the new value in the binary tree is resolvable. If so, the new value is processed. If not, required secondary values of the binary tree are retrieved to resolve the position of the new value in the binary tree.

A computer readable storage medium includes executable instructions to order a binary tree using primary values and required secondary values necessary to resolve a position in the binary tree. The remaining secondary values are in a do not care state. A selected primary value is compared to the primary value at a designated node of the binary tree and, only if necessary, a selected secondary value to the secondary value at the designated node to determine whether the selected primary value and the selected secondary value or the value at the designated node should be relocated in the binary tree.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
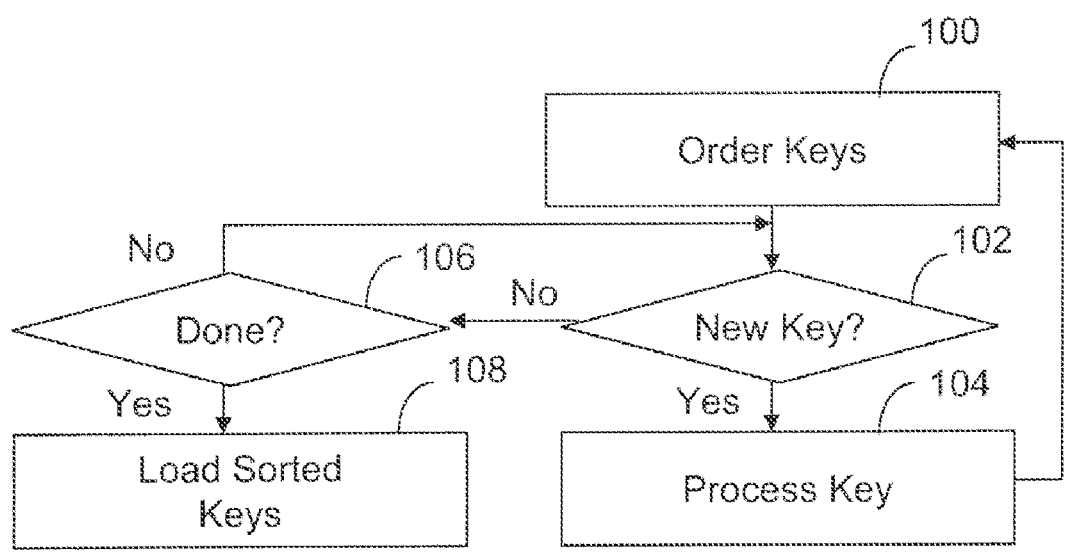
FIG. 1 illustrates heap sort processing performed in accordance with the prior art.
Figure 2:
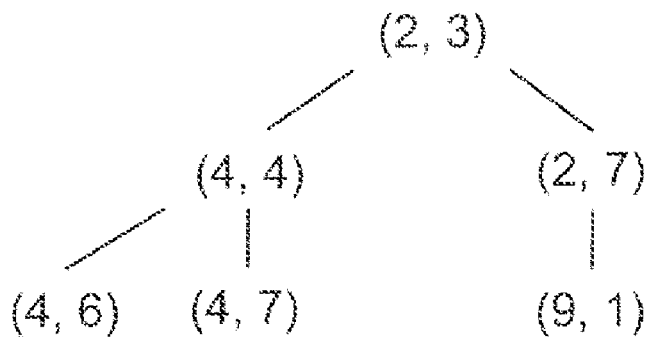
FIGS. 2-5 illustrate a specific example of heap sort processing performed in accordance with the prior art.
Figure 3:
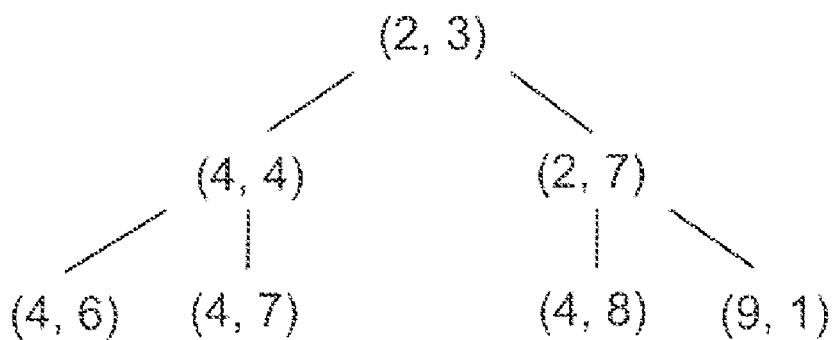
Figure 4:
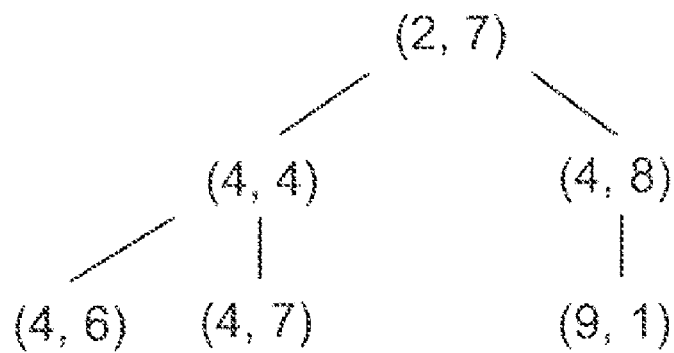
Figure 5:
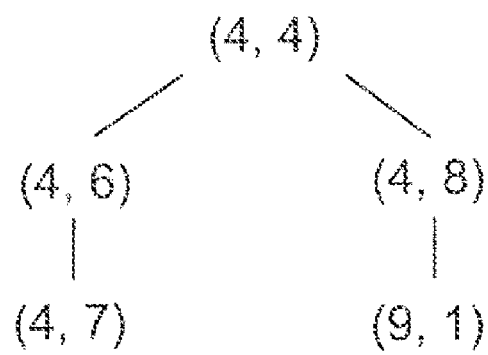
Figure 6:
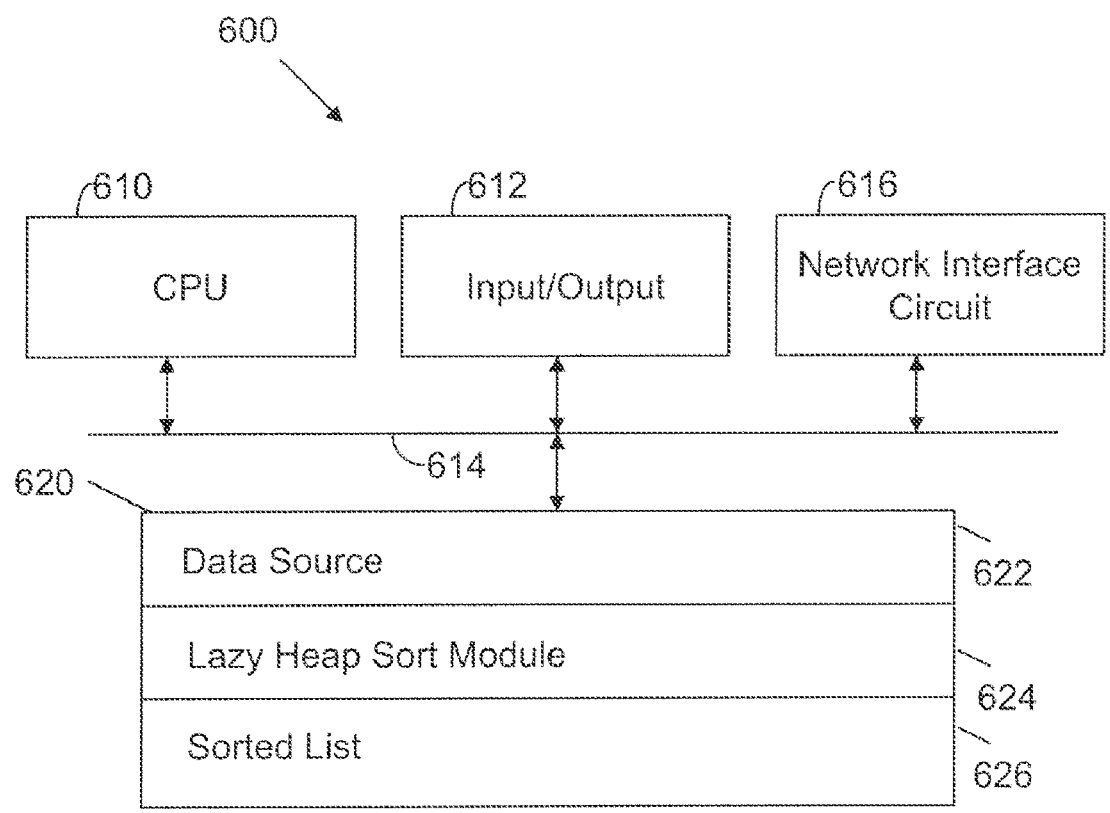
FIG. 6 illustrates a computer configured in accordance with an embodiment of the invention.

FIG. 6 illustrates a computer 600 configured in accordance with an embodiment of the invention. The computer 600 includes standard components, such as a central processing unit 610 and input/output devices 612 connected via a bus 614. The input/output devices 612 may include a keyboard, mouse, display, printer and the like. A network interface circuit 616 is also connected to the bus 614 to provide connectivity to a network (not shown).

A memory 620 is also connected to the bus 614. The memory may store a data source 622, such as a database. A lazy heap sort module 624 is also stored in the memory 620. The lazy heap sort module 624 includes executable instructions to implement operations of the invention. The lazy heap sort module 624 produces a sorted list 626.

Computer 600 is a simplified characterization of an implementation of the invention. Typically, the invention will be implemented in a distributed environment. For example, the data source 622 will typically be a massively parallel database operating on numerous nodes. Similarly, the memory 620 may be a combination of primary memory and disk memory distributed across many nodes. The lazy heap sort module 624 may also be distributed and executed on numerous nodes. Similarly, the sorted list 626 may also be on a number of nodes, including primary and secondary memory.

Figure 7:
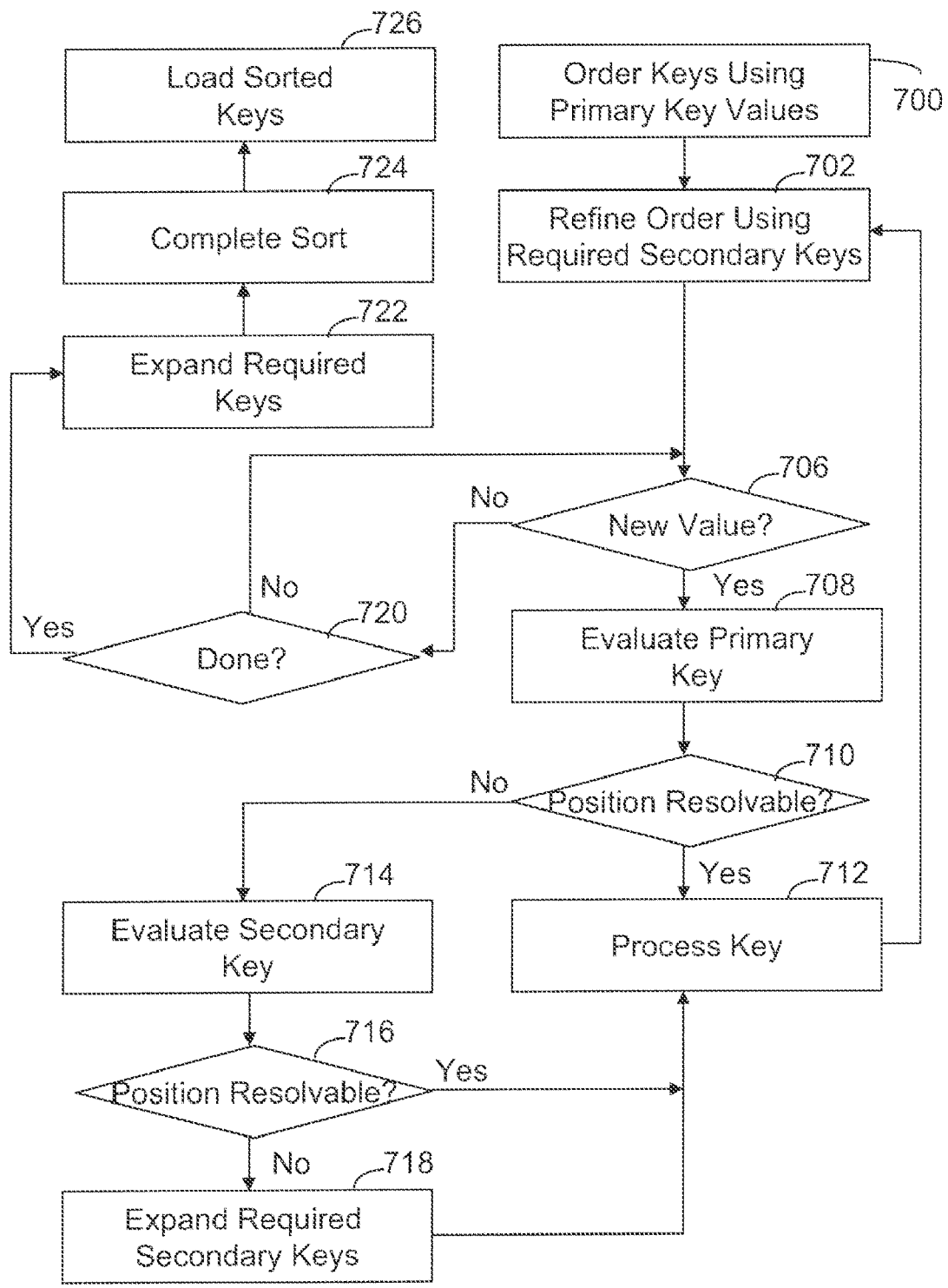
FIG. 7 illustrates heap sorting processing operations performed in accordance with an embodiment of the invention.

FIG. 7 illustrates processing associated with an embodiment of the lazy heap sort module 624. Initially, a heap is partially sorted using only primary values 700. In general, a value will be one of several sort columns. Alternately, a value is simply a string or a portion thereof. The order is then refined using required secondary values (e.g., the second value of a multiple value string). This process may be repeated for multiple values, as required, but the example focuses upon two values to simplify the discussion.

While a value may be any quantity down to a single bit, in most instances a value will be a relatively large quantity, such as the value in a column of a table. In the case of a column listing telephone numbers, each value will have 10 characters. In the case of a column listing an address, an even larger value is implicated. By focusing on the primary values initially, the invention avoids the unnecessary access and comparison expense of expanding the second value to its full value.

When a new value arrives (New Value—YES) 706, the primary value is evaluated 708. If the new value's position is resolvable based upon the primary value (Resolvable—YES) 710, then the value is processed 712. Control then returns to block 702, where the order of the heap is refined using secondary values 702, if necessary to re-establish the heap property.

Returning to block 710, if the position of the new value is not resolvable (Position Resolvable—NO), then the secondary value is evaluated 714. If the position is resolvable with the secondary value (Position Resolvable—YES) 716, then control returns to block 712. If the position is not resolvable with the secondary value alone (Position Resolvable—NO) 718, then additional secondary values within the heap are expanded 718 until the position is resolved. Thereafter, control returns to block 712.

Expanding values is a relatively inexpensive operation in this context. Consider the case of a tuple with values 1 through N. Value 1 is the primary value, while value 2 is the secondary value. Each node of the heap may be assigned an index value with an associated pointer to the value in the tuple. For example, if the value (2, ?) is at the root node of the heap, the root node may have an index value of 1. This index value points to the position of the tuple in memory. Therefore, if the secondary value is required it can be quickly fetched from memory.

Returning to block 706, if a new value does not arrive, a check is made at block 720 to determine if the process is complete. If not (Done—NO) 720, then control returns to block 706. If so (Done—YES) 720, values required for heap sorting are expanded 722. The sort operation is then completed 724 and the sorted values are loaded into a sorted list 726. Secondary values may be expanded as required when a root node is removed from the heap.

Figure 8:
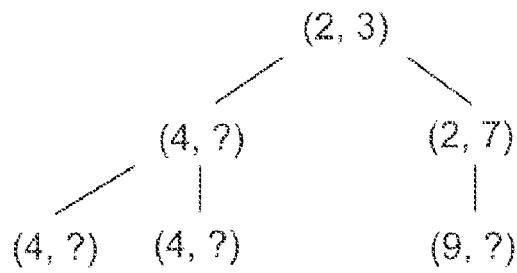
FIGS. 8-16 illustrate a specific example of heap sort processing performed in accordance with an embodiment of the invention.

The operations of FIG. 7 are more fully appreciated in connection with a specific example. Consider the heap of FIG. 8. The heap is sorted largely by primary value. Only two secondary values are expanded (i.e., the 3 of (2, 3) and the 7 of (2, 7)). The remaining secondary values have not been expanded to actual values, yet the heap has been sorted using the "do not care" secondary values, indicated with a "?". These collapsed secondary values may be represented in a compact manner, such as with a single bit.

Figure 9:
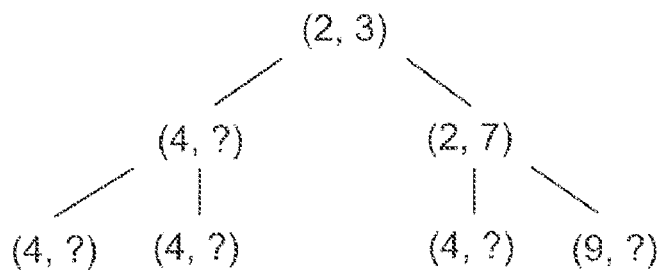

Now consider a new value (4, 8). The primary value (i.e., 4) is evaluated 708. The position of the new value is resolvable based upon the primary value. This processing results in the heap of FIG. 9.

Figure 10:
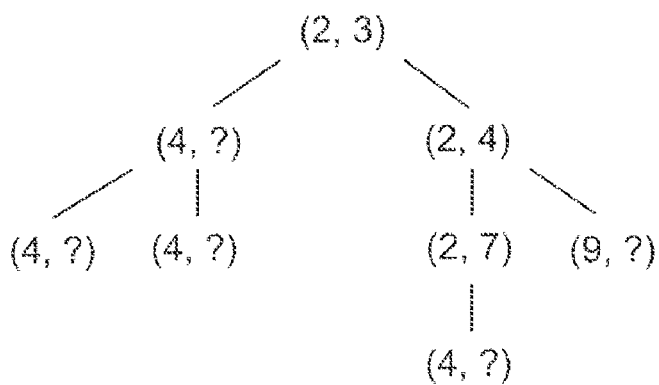

Now consider a new value (2, 4). The primary value is evaluated 708. Since its primary value (2) is equal to the primary value of the root value (2) the position is not resolvable. The secondary value (4) is expanded at which point the position becomes resolvable. This processing results in the heap of FIG. 10.

Figure 11:
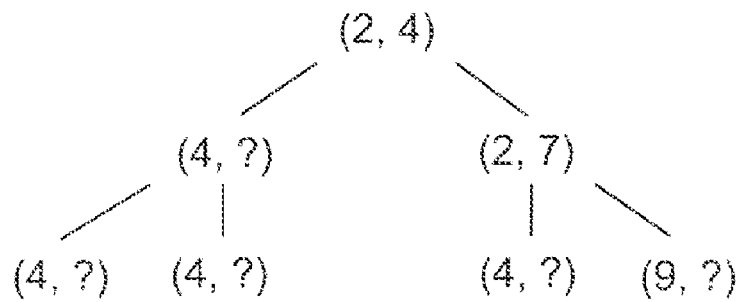
Figure 12:
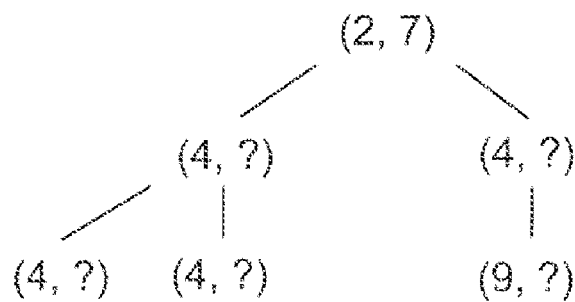
Figure 13:
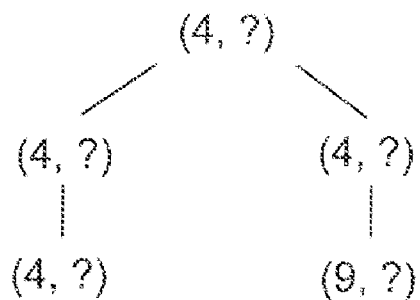
Figure 14:
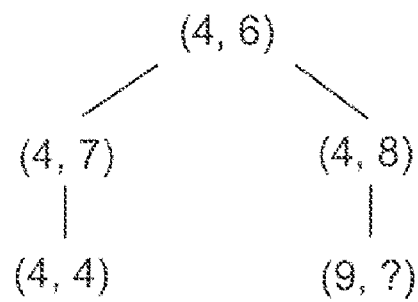
Figure 15:
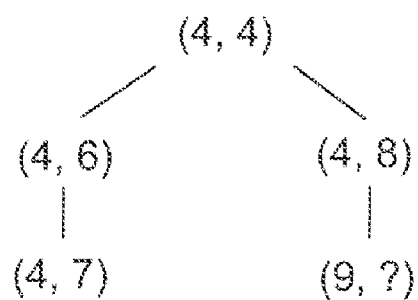

Suppose no new values arrive. The root value (2, 3) is removed and placed in the sorted list. The heap is reorganized so that (2, 4) becomes the new root value, see FIG. 11. Next, (2, 4) is removed and placed in the sorted list, as shown in FIG. 12. Then, (2, 7) is removed and placed in the sorted list. At this point, the new root value cannot be determined based on the primary values of the candidate elements (4) alone, see FIG. 13. The secondary values of all elements with primary value (4) have to be expanded, as shown in FIG. 14. Once all secondary values are expanded, the heap is reorganized and (4, 4) becomes the new root value. This results in the heap of FIG. 15. Observe that the secondary value associated with the primary value 9 is not retrieved because its value is not required to sort the heap.

Figure 16:
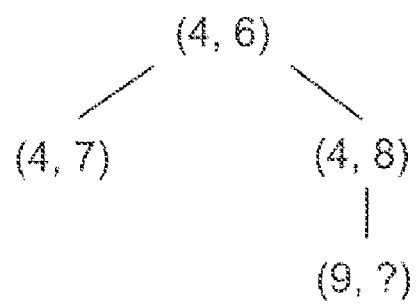

At this point the root value (4, 4) is removed and placed in the sorted list. Now (4, 6) becomes the new root value, as shown in FIG. 16. The processing is repeated until all values have been retrieved from the heap.

Thus, the processing of the invention reduces unnecessary value expansion and also reduces the number of comparisons that would other-vise occur in traditional heap processing. This processing occurs in a very small overhead space. In addition, information may be preserved for merge processing. For example, values may be stored in a collapsed state. In addition, the merge processing may utilize the lazy heap sorting methodology of the invention, providing yet another computational benefit.

Those skilled in the art will recognize various implementations that may be utilized in accordance with embodiments of the invention. For example, new values may be placed at the bottom of a tree. The new values are then compared to values at a level above the bottom of the tree. Once again, values are only expanded, as necessary, to resolve a position. This process is repeated at higher levels until the tree is sorted. Similarly, once a tree is constructed, removal of the root node leaves a "hole" at the root node. This hole is filled by moving a value from a level below. Once again, values are only expanded, as necessary, to determine the smallest item for positioning at the root node. The item removed to fill the hole at the root node leaves another hole in the tree, which is filled by an item from a level below in the same manner. Thus, there are many techniques available to build and deconstruct a tree. In each instance, the invention relies upon collapsed values in a do not care state and only expands those values, as required, to resolve a position in the tree.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific-embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:

order data elements comprising columns of a table in a binary tree data structure using primary values of the data elements and selected secondary values of the data elements required to resolve a position of a particular data element in the binary tree data structure, where the remaining secondary data values are in a do not care state, each data element comprising a plurality of fields of various data types;

compare a new primary data value of a new data element to the primary data value of a data element at a root node of the binary tree data structure and, only if necessary to resolve the position of the new data element, compare a new secondary data value to the secondary data value at the root node to determine whether the new data element or the data element at the root node should be relocated in the binary tree data structure; and retrieve data elements from the binary tree data structure into a sorted list while maintaining a heap property of the binary tree data structure, the data elements in the sorted list having do not care state values.

2. The computer readable storage medium of claim 1 further comprising executable instructions to use the new primary data value and the new secondary data value to place the new data element at the root node and order the binary tree data structure using primary data values and selected secondary data values required to resolve a position in the binary tree data structure.

3. The computer readable storage medium of claim 1 wherein the data elements comprise results of queries on a database.

4. A non-transitory computer readable storage medium, comprising executable instructions to:

order data elements comprising columns of a table in a binary tree data structure using primary values of the data elements, each data element comprising a plurality of fields of various data types;

refine the order of the data elements of the binary tree data structure using any secondary values required to resolve positions in binary tree data structure while the remaining secondary values are in a do not care state;

determine if the position for a new data element compared to the binary tree data structure is resolvable based upon the primary value of the new data element and, if resolvable, process the new value, otherwise evaluate a secondary value of the new data element to determine if the position of the new data element in the binary tree data structure is resolvable, and if the new data element is resolvable using said secondary value, process the new value, otherwise invoke other secondary values to resolve the position of the new data element in the binary tree data structure and load values from the binary tree data structure into a sorted list while maintaining a heap property of the binary tree data structure, the sorted list storing do not care state values.

5. The computer readable storage medium of claim 4 wherein the executable instructions to process the new value include executable instructions to place the new value at a root node of the binary tree data structure.

6. The computer readable storage medium of claim 4 further comprising executable instructions to order the binary tree data structure using primary values and selected secondary values as required to resolve a position in the binary tree data structure.

7. The computer readable storage medium of claim 4 further comprising executable instructions to merge a plurality of sorted lists.

8. A computer implemented method for sort ordering data elements in a binary tree data structure, comprising:
    ordering the data elements, comprising columns of a table, in the binary tree data structure using primary values and any secondary values of the data elements necessary to resolve a position in the binary tree data structure, where the remaining secondary values are in a do not care state, each data element comprising a plurality of fields of various data types;
    comparing a selected primary value of a new data element to the primary value of another data element at a designated node of the binary tree data structure and, only if necessary to resolve position, comparing a selected secondary value to the secondary value of said other data element at the designated node to determine whether the new data element or the other data element at the designated node should be relocated in the binary tree data structure, and
    retrieving data elements from the binary tree data structure into a sorted list while maintaining a heap property of the binary tree data structure, the data elements in the sorted list having do not care state values.

9. The method of claim 8 further comprising, in response to said comparing, placing either the new data element or said other data element at the designated node as determined by a heap property of said binary tree data structure, and ordering the binary tree data structure using primary values and secondary values as necessary to resolve a position in the binary tree.

10. The method of claim 8 wherein the designated node is a root node of the binary tree data structure.

11. The method of claim 8 wherein the designated node is at the bottom of the binary tree data structure.

12. The method of claim 8 wherein said data elements comprise query results on a database.

\* \* \* \* \*